US012712756B2

(12) United States Patent
Yokota et al.

(10) Patent No.: US 12,712,756 B2
(45) Date of Patent: Aug. 18, 2026

(54) COMMUNICATION CONTROL METHOD, TERMINAL, AND RECORDING MEDIUM

(71) Applicant: Panasonic Intellectual Property Management Co., Ltd., Osaka (JP)

(72) Inventors: Tomohiro Yokota, Kyoto (JP); Mariko Nakaso, Shiga (JP); Masafumi Okubo, Kyoto (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 189 days.

(21) Appl. No.: 18/725,021

(22) PCT Filed: Nov. 7, 2023

(86) PCT No.: PCT/JP2023/039967

§ 371 (c)(1),
(2) Date: Jun. 27, 2024

(87) PCT Pub. No.: WO2024/180818

PCT Pub. Date: Sep. 6, 2024

(65) Prior Publication Data

US 2026/0150054 A1 May 28, 2026

(30) Foreign Application Priority Data

Feb. 28, 2023 (JP) ................................ 2023-029822

(51) Int. Cl.
*H04L 12/28* (2006.01)
*H04W 52/02* (2009.01)
*H04W 76/10* (2018.01)

(52) U.S. Cl.
CPC ...... *H04L 12/2823* (2013.01); *H04L 12/2803* (2013.01); *H04L 12/2827* (2013.01); *H04W 52/0251* (2013.01); *H04W 76/10* (2018.02)

(58) Field of Classification Search
CPC . H04W 52/00; H04W 52/02; H04W 52/0258; H04W 52/0274; H04W 4/00;
(Continued)

(56) References Cited

U.S. PATENT DOCUMENTS 9,503,988 B2 * 11/2016 Mach ................ H04W 52/0274
2005/0088318 A1 * 4/2005 Liu ...................... G08G 1/0965
340/995.13

(Continued)

FOREIGN PATENT DOCUMENTS

JP 2003-022225 A 1/2003
JP 2004-348319 A 12/2004

(Continued)

OTHER PUBLICATIONS

International Search Report dated Jan. 23, 2024 issued in International Patent Application No. PCT/JP2023/039967.

(Continued)

*Primary Examiner* — Van T Trieu
(74) *Attorney, Agent, or Firm* — RIMON P.C.

(57) ABSTRACT

By communicating with an object having a communication function and having a function of monitoring a change in operation or state of the object, it is determined whether a notification indicating that the operation or the state managed by the object has changed has been received, and when it is determined that the notification has been received, waiting for reception of an announcement signal for establishing short-range wireless communication with an apparatus different from the object is performed.

6 Claims, 8 Drawing Sheets

(58) Field of Classification Search
CPC ....... H04W 4/80; H04W 76/10; H04W 76/14; H04W 88/02; H04W 52/0251; G08G 1/00; G08G 1/0965; G08G 1/0968; H04L 12/2803; H04L 12/2823; H04L 12/1827
See application file for complete search history.

(56) References Cited

U.S. PATENT DOCUMENTS

| | | | | |
|---|---|---|---|---|
| 2009/0228157 | A1* | 9/2009 | Breed | G08G 1/161 701/1 |
| 2015/0145693 | A1 | 5/2015 | Toriumi et al. | |

FOREIGN PATENT DOCUMENTS

| | | | |
|---|---|---|---|
| JP | 2014-060600 | A | 4/2014 |
| JP | 2015-231090 | A | 12/2015 |
| JP | 2016-042234 | A | 3/2016 |
| JP | 2016-220054 | A | 12/2016 |
| JP | 2021-082175 | A | 5/2021 |
| JP | 7191274 | B1 | 12/2022 |
| WO | 2014/115325 | A1 | 7/2014 |

OTHER PUBLICATIONS

Extended European Search Report dated Dec. 8, 2025 issued in the corresponding European Patent Application No. 23899110.3.

* cited by examiner

Figure 1:
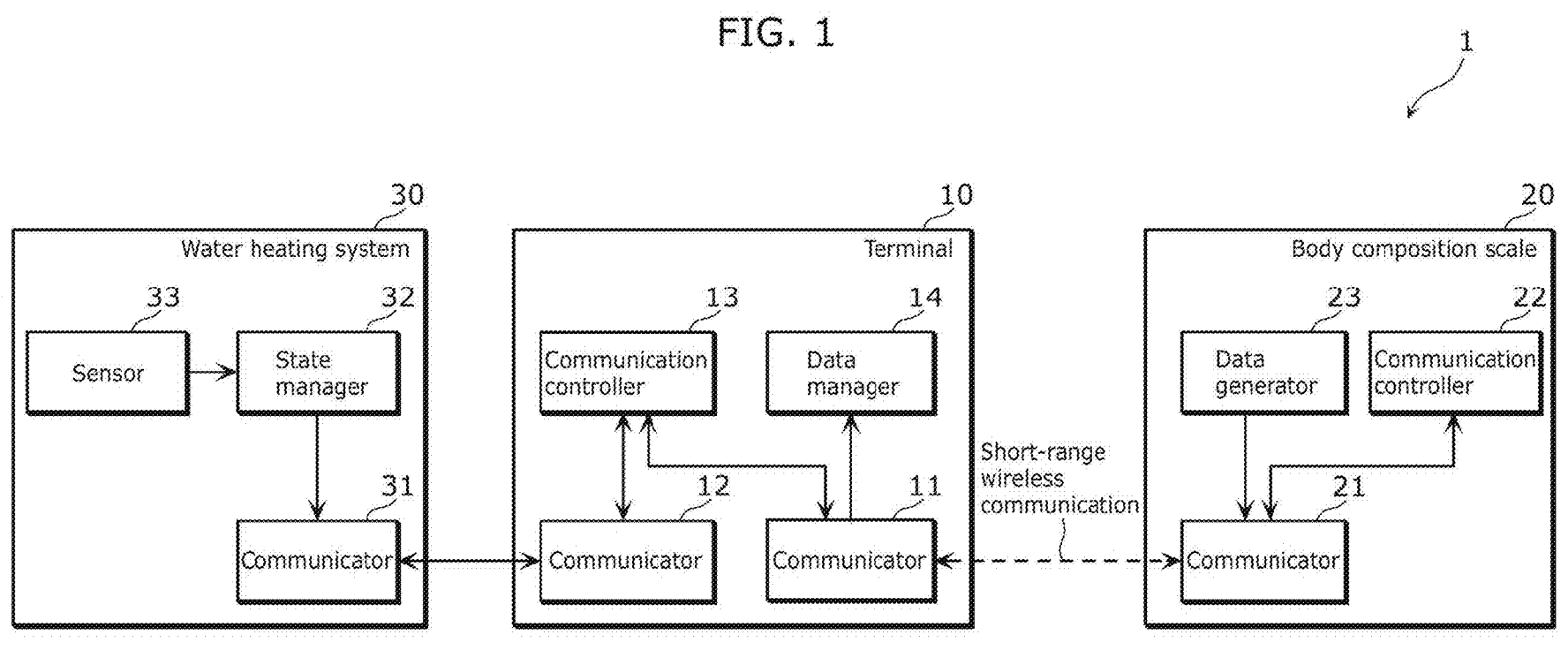

20 Body composition scale
22 Communication controller
23 Data generator
21 Communicator Short-range wireless communication 10 Terminal
14 Data manager
11 Communicator
13 Communication controller
12 Communicator 30 Water heating system
32 State manager
31 Communicator
33 Sensor

FIG. 3

Time

40

Change in state of water heating system

41

42

Waiting for reception by terminal

47

Measurement and advertising-signal transmission by body composition scale 43 44

45

1B
10B
Terminal
App unit
70
73
Alarm controller
15
Time manager
72
State manager
13
Communication controller
14
Data manager
71
Communicator
12B
Communicator
11
Communicator
Short-range wireless communication
20B
Basal body temperature scale
23B
Data generator
22
Communication controller
21
Communicator

COMMUNICATION CONTROL METHOD, TERMINAL, AND RECORDING MEDIUM

CROSS-REFERENCE OF RELATED APPLICATIONS

This application is the U.S. National Phase under 35 U.S.C. § 371 of International Patent Application No. PCT/JP2023/039967, filed on Nov. 7, 2023, which in turn claims the benefit of Japanese Patent Application No. 2023-029822, filed on Feb. 28, 2023, the entire disclosure of which Applications are incorporated by reference herein.

TECHNICAL FIELD

The present disclosure relates to a communication control method, a terminal, and a recording medium.

BACKGROUND ART

In recent years, there is an apparatus control device that transmits a change in state of an apparatus to be controlled to a terminal connected to the Internet (see Patent Literature (PTL) 1, for example).

CITATION LIST

Patent Literature

[PTL 1] Japanese Unexamined Patent Application Publication No. 2003-022225

SUMMARY OF INVENTION

Technical Problem

The short-range wireless-communication function activated by an apparatus for a long time causes an increase in the power consumption.

The present disclosure provides a communication control method, a terminal, a program, and a communication system, each of which allows for establishing a short-range wireless communication connection while reducing the power consumption.

Solution to Problem

A communication control method according to the present disclosure is a communication control method for a terminal. The communication control method includes: by communicating with an object having a communication function and having a function of monitoring a change in operation or state of the object, determining whether a notification indicating that the operation or the state managed by the object has changed has been received; and when it is determined that the notification has been received, performing waiting for reception of an announcement signal for establishing short-range wireless communication with an apparatus different from the object.

Advantageous Effects of Invention

The communication control method according to the present disclosure allows for establishing a short-range wireless communication connection while reducing the power consumption.

BRIEF DESCRIPTION OF DRAWINGS

FIG. 1 is a diagram illustrating a communication system according to an embodiment.

FIG. 3 is a flow diagram illustrating an exemplary process of a water heating system according to the embodiment.

DESCRIPTION OF EMBODIMENTS

Figure 2:
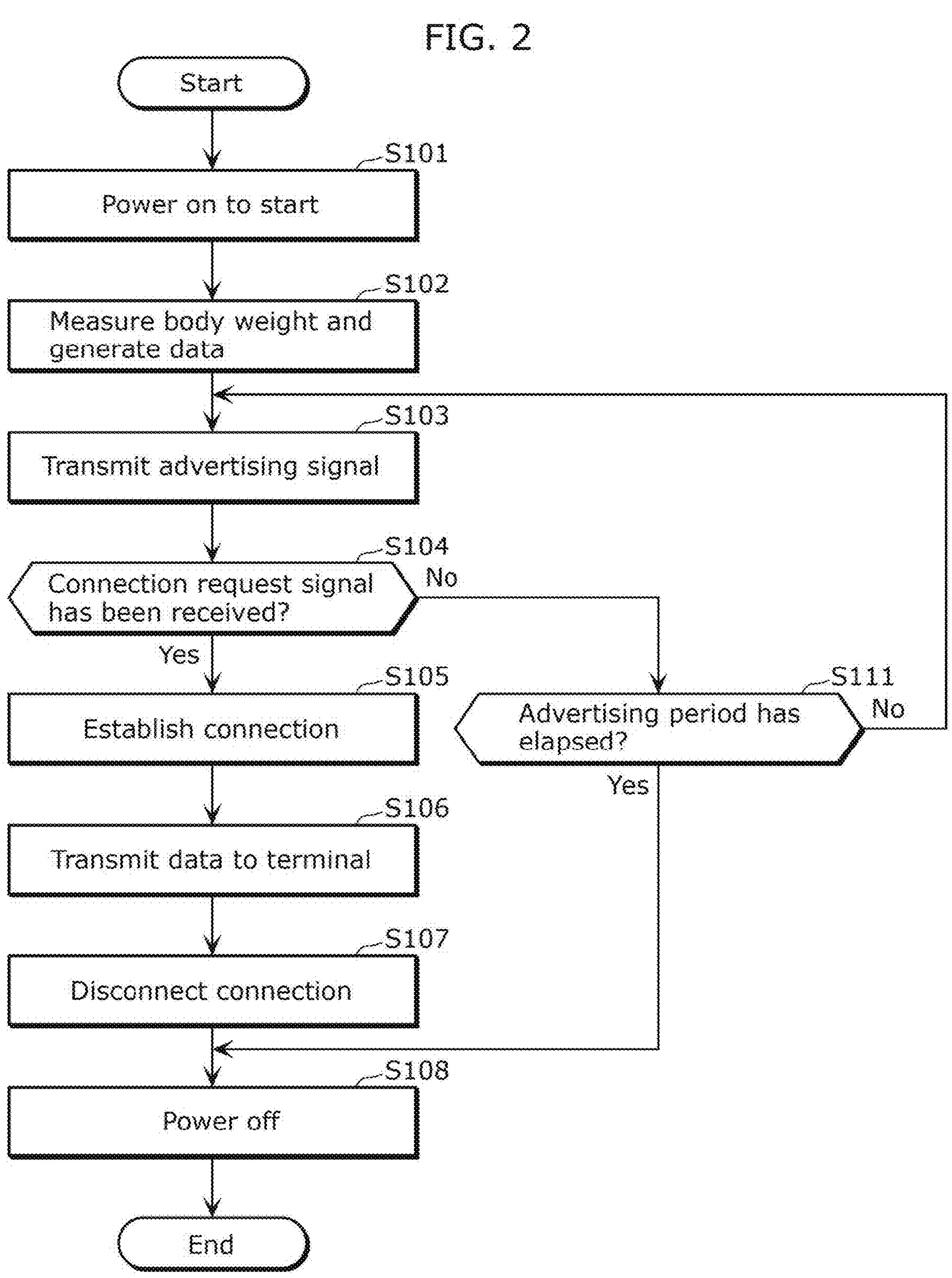
FIG. 2 is a flow diagram illustrating an exemplary process of a body composition scale according to the embodiment.

Underlying Knowledge Forming Basis of the Present Disclosure

The inventors have found that the following problem arose in the technique regarding the short-range wireless communication described in section "Technical Problem".

For the short-range wireless communication, an apparatus consumes relatively high electric power. This is because, in order to transmit and receive radio waves including a signal in wireless communication, a wireless communication circuit needs to be powered by electricity. This is also because electricity must be continuously supplied to the wireless communication circuit to keep the wireless communication circuit in a state where the wireless communication circuit can receive the signal transmitted from another communication device at any time.

Accordingly, the short-range wireless-communication function activated by the apparatus for a long time causes an increase in the power consumption.

In view of this, the inventors have conceived of the possibility that when, before or after a timing of use of one apparatus, another apparatus is used, the short-range wireless communication connection can be established while reducing the power consumption by activating the wireless communication function of the one apparatus using a change in state of the another apparatus as a trigger.

The following illustrates the invention derived from the present disclosure of the present application, and describes advantageous effects derived from the invention, etc.

(i) A communication control method for a terminal, including: determining whether a notification has been received, by communicating with an object having a communication function and having a function of monitoring a change in operation or state of the object, the notification indicating that the operation or the state managed by the object has changed; and when it is determined that the notification has been received, performing waiting for reception of an announcement signal for establishing short-range wireless communication with an apparatus different from the object.

According to this aspect, when the probability of transmitting an announcement signal from the apparatus is relatively high, waiting for reception of the announcement signal is performed using a change in operation or state of the object as a trigger. In this manner, the short-range wireless communication connection with the apparatus can be established. If, regardless of the probability of transmitting the announcement signal, the waiting for reception is always performed to allow for the short-range wireless communication with the apparatus at any time, waiting for reception is performed for a long time, thereby increasing the power consumption. According to this aspect, it is possible to shorten the performing time of waiting for reception and reduce the power consumption by performing the waiting for reception of the announcement signal when the probability of transmitting the announcement signal is relatively high. As described above, according to this aspect, it is possible to establish a short-range wireless communication connection while reducing the power consumption.

(ii) The communication control method according to (i), in which the apparatus is a first apparatus, and the object is a second apparatus different from both the first apparatus and the terminal.

According to this aspect, when the probability of transmitting an announcement signal from the first apparatus is relatively high, waiting for reception of the announcement signal is performed by the terminal using the change in operation or state of the second apparatus as a trigger. In this manner, the short-range wireless communication connection with the apparatus can be established. Accordingly, by using a change in operation or state of the second apparatus used by a user at a time relatively close to use of the first apparatus, the terminal can establish a short-range wireless communication connection while reducing the power consumption.

(iii) The communication control method according to (ii), in which the first apparatus is a body composition scale, the second apparatus is a water heating system including a sensor that senses a person in a bathroom, and the notification indicates that the sensor has changed from a state in which the sensor is sensing a person to a state in which the sensor is sensing no person.

According to this aspect, when the probability of transmitting an announcement signal from the body composition scale is relatively high, waiting for reception of the announcement signal is performed by the terminal using the change in state of the water heating system as a trigger. In this manner, the short-range wireless communication connection with the body composition scale can be established. Accordingly, by using a change in state of the water heating system used by a user at a time relatively close to use of the body composition scale, the terminal can establish a short-range wireless communication connection while reducing the power consumption.

(iv) The communication control method according to (ii), in which the first apparatus is a body composition scale, the second apparatus is a washing machine having a deodorizing function for deodorizing an inside of a washing machine tub, and the notification indicates that the deodorizing function has changed from a non-operating state to an operating state.

According to this aspect, when the probability of transmitting an announcement signal from the body composition scale is relatively high, waiting for reception of the announcement signal is performed by the terminal using the change in state of the washing machine as a trigger. In this manner, the short-range wireless communication connection with the body composition scale can be established. Accordingly, by using a change in state of the washing machine used by a user at a time relatively close to use of the body composition scale, the terminal can establish a short-range wireless communication connection while reducing the power consumption.

(v) The communication control method according to (i), in which the object is a process running on the terminal.

According to this aspect, when the probability of transmitting an announcement signal from the first apparatus is relatively high, waiting for reception of the announcement signal is performed by the terminal using the change in operation or state of a process running on the terminal as a trigger. In this manner, the short-range wireless communication connection with the apparatus can be established. Accordingly, by using a change in operation or state of the process used by a user at a time relatively close to use of the first apparatus, the terminal can establish a short-range wireless communication connection while reducing the power consumption.

(vi) The communication control method according to (v), in which the apparatus is a basal body temperature scale, the process is a process of an application software that activates an alarm of the terminal at a predetermined time, and the notification indicates that the alarm has changed from an activated state to a non-activated state.

According to this aspect, when the probability of transmitting an announcement signal from the basal body temperature scale is relatively high, waiting for reception of the announcement signal is performed by the terminal using the change in state of the alarm of the terminal as a trigger. In this manner, the short-range wireless communication connection with the basal body temperature scale can be established. Accordingly, by using a change in state of the alarm used by a user at a time relatively close to use of the basal body temperature scale, the terminal can establish a short-range wireless communication connection while reducing the power consumption.

(vii) The communication control method according to any one of (i) to (vi), in which reception of the notification includes: reception of a notification transmitted by a server to the terminal after the notification is transmitted by the object to the server, the notification indicating that the operation or the state managed by the object has changed.

According to this aspect, by performing waiting for reception of the announcement signal using the notice received via the server that manages the state of apparatus, the terminal can establish a short-range wireless communication connection with the apparatus. When there are one or more objects, a server that manages the operations or states of the one or more objects is useful. By using a notification from such a server to perform the waiting for reception of the announcement signal when the probability of transmitting the announcement signal is relatively high, the terminal can shorten the performing time of waiting for reception and reduce the power consumption. As described above, according to this aspect, it is possible to establish a short-range wireless communication connection while reducing the power consumption.

(viii) The communication control method according to (i), further including: selecting the object from among one or more candidate objects, in which the selecting includes: obtaining one or more first timings when the apparatus operates and one or more second timings when the operation or the state of each of the one or more candidate objects changes; and from among the one or more candidate objects, selecting, as the object, a candidate object whose correlation between the one or more second timings of the candidate object and the one or more first timings is at least a predetermined level.

According to this aspect, an object serving as a trigger of the operation of the apparatus can be selected using the level of the correlation between the operation timings of the apparatus and the timings of a change in operation or state of the object. By using a notification from the selected object to perform the waiting for reception of the announcement signal when the probability of transmitting the announcement signal is relatively high, it is possible to shorten the performing time of waiting for reception and reduce the power consumption. As described above, according to this aspect, it is possible to establish a short-range wireless communication connection while reducing the power consumption.

(ix) The communication control method according to (viii), in which the one or more first timings are one or more timings when a body composition scale measures a body composition value of a user, the body composition scale being the apparatus, and the one or more second timings are one or more timings when a water heating system including a sensor that senses a person in a bathroom changes from a state in which the sensor is sensing a person to a state in which the sensor is sensing no person, the water heating system being the object.

According to this aspect, an object can be selected using the timings of a change in state of the water heating system and the timings of measurement of a body composition value by the body composition scale, and the terminal can establish a short-range wireless communication connection with the apparatus. Thus, according to this aspect, an object is selected using the timings of a change in state of the water heating system and the timings of measurement by the body composition scale, and thus it is possible to more appropriately establish a short-range wireless communication connection while reducing the power consumption.

(x) The communication control method according to (viii), in which the one or more first timings are one or more timings when a body composition scale measures a body weight of a user, the body composition scale being the apparatus, and the one or more second timings are one or more timings when a washing machine having a deodorizing function for deodorizing an inside of a washing machine tub changes from a state in which the deodorizing function is not operating to a state in which the deodorizing function is operating, the washing machine being the object.

According to this aspect, an object can be selected using the timings of a change in state of the washing machine and the timings of measurement of a body composition value by the body composition scale, and the terminal can establish a short-range wireless communication connection with the apparatus. Thus, according to this aspect, an object is selected using the timings of a change in state of the washing machine and the timings of measurement by the body composition scale, and thus it is possible to more appropriately establish a short-range wireless communication connection while reducing the power consumption.

(xi) The communication control method according to (viii), in which the one or more first timings are one or more timings when a basal body temperature scale measures a basal body temperature of a user, the basal body temperature scale being the apparatus, and the one or more second timings are one or more timings when a process of an application software that activates an alarm of the terminal at a predetermined time changes from a state in which the alarm is activated to a state in which the alarm is not activated, the process being the object.

According to this aspect, an object can be selected using the timings of a change in state of the alarm of the terminal and the timings of measurement of a basal body temperature by the basal body temperature scale, and the terminal can establish a short-range wireless communication connection with the apparatus. Thus, according to this aspect, an object is selected using the timings of a change in state of the alarm of the terminal and the timings of measurement by the basal body temperature scale, and thus it is possible to more appropriately establish a short-range wireless communication connection while reducing the power consumption.

(xii) A terminal including: a communication controller that determines whether a notification has been received, by communicating with an object having a communication function and having a function of monitoring a change in operation or state of the object, the notification indicating that the operation or the state managed by the object has changed; and a communicator that performs, when the communication controller determines that the notification has been received, waiting for reception of an announcement signal for establishing short-range wireless communication with an apparatus different from the object.

This aspect produces the advantageous effect similar to that of the above-mentioned communication control method.

(xiii) A non-transitory computer-readable recording medium storing a program for causing a computer to execute the communication control method according to (i).

This aspect produces the advantageous effect similar to that of the above-mentioned communication control method.

Hereinafter, an embodiment is described in details with reference to the drawings. It is to be noted that the excessively detailed explanation may be omitted. For example, the detailed explanation of a well-known matter or the same explanation for the substantially the same configuration may be omitted. This is to avoid the unnecessary redundancy in the following description and help those skilled in the art to understand the embodiment.

It is to be noted that the inventor(s) provides the accompanying drawings and the following descriptions in order to enable those skilled in the art to fully understand this disclosure, and which is not intended to limit the subject matter recited in claims.

Embodiment

According to the present embodiment, a communication control method or the like that establishes a short-range wireless communication connection while reducing the power consumption is described.

FIG. 1 is a diagram illustrating communication system 1 according to the present embodiment. The communication control method of communication system 1 is described with referent to FIG. 1.

As shown in FIG. 1, communication system 1 includes terminal 10, body composition scale 20, and water heating system 30. It is assumed that terminal 10, body composition scale 20, and water heating system 30 are placed in one dwelling, but the present disclosure is not limited to this.

In communication system 1, body composition scale 20 is an example of an apparatus or a first apparatus. Water heating system 30 is (i) an example of an object having a communication function and having a function of monitoring a change in operation or state of the object, and (ii) an example of a second apparatus.

When terminal 10 and body composition scale 20 are located in a distance range in which short-range wireless communication is available, terminal 10 and body composition scale 20 can communicate with each other via the short-range wireless communication. Terminal 10 and water heating system 30 also can communicate with each other.

Terminal 10 is an information processing device that obtains and holds measurement values of body composition scale 20. For example, terminal 10 is a smart phone, a tablet computer, a personal computer, or the like.

Terminal 10 includes communicators 11 and 12, communication controller 13, and data manager 14.

Communicator 11 is a communication interface for the short-range wireless communication. Communicator 11 includes hardware required for wireless communication such as an antenna and a wireless circuit, and communicates with body composition scale 20 (in particular, communicator 21 of body composition scale 20) through radio waves. The short-range wireless communication is, for example, a communication system in which a communication with a counterpart within a predetermined distance (about several meters) is possible and a communication with a counterpart beyond the predetermined distance is impossible. Here, a case where the short-range wireless communication is wireless communication compliant with the Bluetooth (registered trademark) low energy (BLE) standard is described as an example. It is to be noted that Bluetooth Classic or Wi-Fi (registered trademark) is also possible as another example of the short-range wireless communication.

Communicator 11 waits for reception of an announcement signal from body composition scale 20 under the control by communication controller 13. The announcement signal is a communication signal transmitted first for the communication between body composition scale 20 and terminal 10. The announcement signal in the BLE standard is an advertising signal. Hereinafter, a case where the advertising signal is used as the announcement signal is described as an example. The waiting for reception refers to waiting for reception of the advertising signal to be transmitted from body composition scale 20 through a communication channel while scanning one or more possible communication channels (in general, also referred to as advertisement channels) through one of which body composition scale 20 transmits the advertising signal.

Communicator 11 performs waiting for reception during the first period determined by communication controller 13. Communicator 11 may continuously perform waiting for reception during the first period. In other words, communicator 11 may wait for reception continuously or without interruption during the first period. It is to be noted that communicator 11 may be controlled not to perform waiting for reception (i.e., to be prohibited from waiting for reception) during a period other than the first period.

When receiving the announcement signal transmitted from body composition scale 20 while waiting for reception, communicator 11 establishes a BLE connection with body composition scale 20. Subsequently, communicator 11 receives data including a measurement value from body composition scale 20 through the established connection, and disconnects the established connection after the receipt is completed. Communicator 11 provides the received data to data manager 14.

Communicator 12 is a communication interface for communicating with water heating system 30. Communicator 12 may be a wired communication interface or a wireless communication interface. For example, when terminal 10 and water heating system 30 are placed in one dwelling, communicator 12 may be a communication interface for communicating with water heating system 30 via the Wi-Fi base station placed in the one dwelling.

Communicator 12 receives a change-in-state notification (described below) from water heating system 30. When receiving the change-in-state notification, communicator 12 provides the change-in-state notification to communication controller 13.

Communication controller 13 is a function unit that controls the operation of communicator 11. Communication controller 13 is implemented by causing a processor (e.g., a Central Processing Unit (CPU)) of terminal 10 to execute a predetermined program.

Communication controller 13 determines a period regarding the operation of communicator 11 using the change-in-state notification received from communicator 12, and controls the operation of communicator 11 using the determined period. Communication controller 13 determines at least the first period as the period regarding the operation of communicator 11. The first period is a period during which communicator 11 waits for reception of a new announcement signal from body composition scale 20 in the future.

More specifically, communication controller 13 determines the first period using the change-in-state notification received by communicator 12 communicating with water heating system 30. Communication controller 13 determines whether communicator 12 has received the change-in-state notification. When it is determined that communicator 12 has received the change-in-state notification, communication controller 13 determines the first period so that the first period starts. For example, communication controller 13 can determine the first period so that the first period starts within a predetermined period (e.g., a period of about several seconds to several minutes) after a time when a change in state has occurred which is indicated by the change-in-state notification For example, the length of time of the first period is 10 minutes.

Data manager 14 is a function unit that obtains and manages data including a measurement value, obtained from body composition scale 20. Data manager 14 obtains the data via communicator 11.

Data manager 14 is implemented by causing a processor (e.g., a CPU) of terminal 10 to execute a predetermined program, and may include a storage (e.g., a semiconductor memory) of terminal 10. Data managed by data manager 14 can be used for various applications. For example, data managed by data manager 14 is converted to a time-series graph of the measurement value, and the graph may be displayed on the display screen (not shown) of terminal 10. Data managed by data manager 14 is also transmitted to a management server (not shown). After a statistical process is performed or the knowledge of a specialist is added, the data may be provided to a user for use in health management.

Body composition scale 20 is a measuring instrument which measures a body composition value that is a value regarding the body composition of a user (specifically, body weight, percent of body fat, muscle mass, an amount of body fat, or the like). Body composition scale 20 obtains a body composition value of a user by measurement and transmits data including the obtained body composition value to terminal 10 via the BLE-standard communication.

As shown in FIG. 1, body composition scale 20 includes communicator 21, communication controller 22, and data generator 23.

Communicator 21 is a communication interface for the short-range wireless communication. Communicator 21 includes hardware required for wireless communication such as an antenna and a wireless circuit, and communicates with terminal 10 (in particular, communicator 11 of terminal 10) through radio waves. The short-range wireless communication standard is the same as the short-range wireless communication standard of communicator 11 of terminal 10. Here, a case where the short-range wireless communication is wireless communication compliant with the BLE standard is described as an example.

Communicator 21 transmits an advertising signal under the control by communication controller 22. More specifically, under the control by communication controller 22, communicator 21 transmits the advertising signal during a predetermine period after the body composition value is measured (also referred to as an advertising period). More specifically, during the advertising period, while selecting one advertisement channel after another from among one or more advertisement channels, communicator 21 repeatedly transmits the advertising signal through the selected one advertisement channel.

Moreover, communicator 21 establishes a BLE connection when the transmitted advertising signal has been received by communicator 11 that is waiting for reception on the communication channel through which the advertising signal has been transmitted. Subsequently, communicator 21 transmits data including the measurement value to terminal 10 through the established connection, and disconnects the established connection after the transmission is completed.

Communication controller 22 is a function unit that controls the operation of communicator 21. Communication controller 22 is implemented by causing a processor (e.g., a CPU) of body composition scale 20 to execute a predetermined program.

Communication controller 22 controls communicator 21 to transmit an advertising signal which is the announcement signal. For example, communication controller 22 controls communicator 21 to transmit an advertising signal during the advertising period. The beginning of the advertising period is, for example, within several seconds to several minutes after body composition scale 20 starts to measure the body composition. The ending of the advertising period is, for example, after about 10 minutes from the start of the advertising period.

Data generator 23 is a function unit that generates data including the measurement value measured by body composition scale 20. Data generator 23 is implemented by causing a processor (e.g., a CPU) of body composition scale 20 to execute a predetermined program. When body composition scale 20 measures the body composition value of a user, data generator 23 generates data including the measured body composition value as the measurement value, and provides the generated data to communicator 21. Subsequently, the data is transmitted from communicator 21 to terminal 10, and managed by terminal 10.

It is to be noted that another apparatus may be used as body composition scale 20. As an example of this another apparatus, a basal body temperature scale for measuring the basal body temperature of a user, a blood pressure monitor for measuring the blood pressure of a user, an activity monitor for measuring an activity amount of a user (e.g., user's steps) is possible.

Water heating system 30 is a water heating system in the dwelling of a user. Water heating system 30 is an apparatus having a function of monitoring a change in operation or state of water heating system 30. Water heating system 30 includes at least a water heater for making hot water by heating water, and may further include one or more other devices or apparatuses. Water heating system 30 is an apparatus serving as a basis of the determination of the first period during which terminal 10 continuously waits for reception.

As shown in FIG. 1, water heating system 30 includes communicator 31, state manager 32, and sensor 33.

Communicator 31 is a communication interface for communicating with terminal 10. Communicator 31 may be a wired communication interface or a wireless communication interface. For example, when terminal 10 and water heating system 30 are placed in one dwelling, communicator 31 may be a communication interface for communicating with water heating system 30 via the Wi-Fi base station placed in the one dwelling.

Communicator 31 transmits a change-in-state notification (described below) generated by state manager 32.

State manager 32 is a function unit that manages the state of water heating system 30. State manager 32 is implemented by causing a processor (e.g., a CPU) of water heating system 30 to execute a predetermined program, and may include a storage (e.g., a semiconductor memory) of water heating system 30. State manager 32 manages the state of water heating system 30 using the sensor information obtained from sensor 33. More specifically, when obtaining, from sensor 33, sensor information indicating that sensor 33 is sensing a person in the bathroom, state manager 32 manages the state of water heating system 30 as a "state in which a person is present in the bathroom", whereas when obtaining, from sensor 33, sensor information indicating that sensor 33 is sensing no person in the bathroom, state manager 32 manages the state of water heating system 30 as a "state in which no person is present in the bathroom". When the state of state manager 30 changes from the "state in which no person is present in the bathroom" to the "state in which a person is present in the bathroom", state manager 32 transmits, to terminal 10, a notification including information indicating the changed state (also referred to as the change-in-state notification).

It is to be noted that state manager 32 may manage the operation of water heating system 30 while or instead of managing the state of water heating system 30. In this case, for example, state manager 32 manages the operation of water heating system 30 according to a user operation performed through the controller (not shown) of state manager 32. An example of the operation of water heating system 30 is a "preferred operation" in which the temperature of hot water for use in the bathroom during bath time can be set preferentially through the controller in the bathroom.

Sensor 33 is a human detecting sensor for sensing a person in the bathroom in the dwelling of a user. Sensor 33 provides, to state manager 32, sensor information (such as analog values, digital values, or numerical information) different between when sensing a person in the bathroom and no person in the bathroom.

The following describes a process of each device included in communication system 1.

FIG. 2 is a flow diagram illustrating an exemplary process of body composition scale 20 according to the present embodiment. The flow diagram shown in FIG. 2 illustrates a process for body composition scale 20 to measure the body weight, which is an example of the body composition value of a user, and transmits data including its measurement value to terminal 10.

In Step S101, body composition scale 20 is powered on to start. For example, the "powered on" bases a user operation.

In Step S102, body composition scale 20 measures the body weight of the user. Data generator 23 generates data including the measurement value indicating user's body weight measured by body composition scale 20.

In Step S103, communicator 21 transmits the advertising signal under the control by communication controller 22. A time when first Step S103 is performed corresponds to the start of the advertising period.

In Step S104, communicator 21 determines whether a connection request signal has been received from terminal 10. The connection request signal is a signal for requesting a BLE connection from body composition scale 20 by terminal 10 that has received the advertising signal transmitted in Step S103 (see Step S304 in FIG. 4 described below). When it is determined that the connection request signal has been received (Yes in Step S104), the next step is Step S105, and otherwise (No in Step S104), the next step is Step S111.

In Step S105, communicator 21 establishes a BLE connection with terminal 10 according to the connection request signal received in Step S104. It is to be noted that to establish a BLE connection may be expressed as to succeed in establishing a BLE connection.

In Step S106, data generator 23 transmits the data generated in Step S102 to terminal 10 through the connection established in Step S105.

In Step S111, communication controller 22 determines whether the advertising period has elapsed. More specifically, when the length of the advertising period has elapsed since first Step S103, communication controller 22 determines that the advertising period has elapsed. When it is determined that the advertising period has elapsed (Yes in Step S111), the next step is Step S108, and otherwise (No in Step S111), the next step is Step S103.

In Step S107, communicator 21 disconnects the connection established in Step S105.

In Step S108, body composition scale 20 is powered off. It is to be noted that when the advertising period has elapsed without receiving the connection request signal in Step S104 (Yes in Step S111), body composition scale 20 is powered off while holding the data generated in Step S102 by data generator 23.

Figure 3:
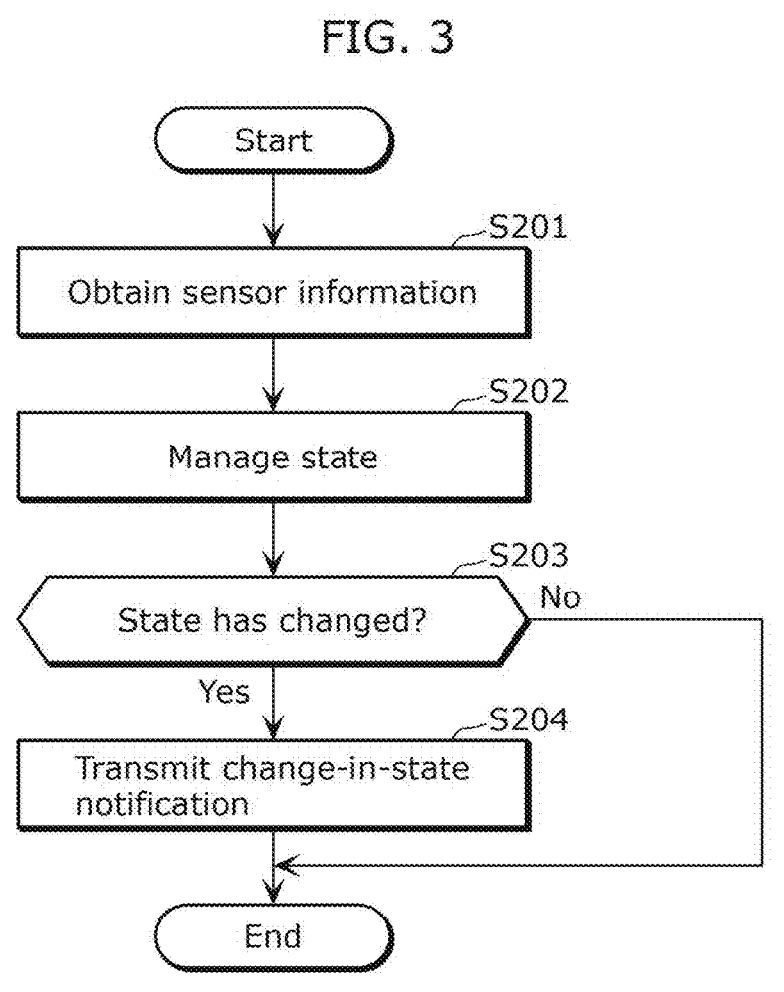

FIG. 3 is a flow diagram illustrating an exemplary process of water heating system 30 according to the present embodiment.

In step S201, state manager 32 obtains sensor information from sensor 33.

In Step S202, state manager 32 manages the state of water heating system 30 using the sensor information obtained in Step S201. For example, when obtaining, from sensor 33, the sensor information indicating that sensor 33 is sensing no person in the bathroom, state manager 32 manages the state of water heating system 30 as "the state in which no person is present in the bathroom".

In Step S203, state manager 32 determines whether the state of water heating system 30 has changed before and after performing Step S202. When it is determined that the state of water heating system 30 has changed (Yes in Step S203), the next step is Step S204, and otherwise (No in Step S203), the series of steps shown in FIG. 3 ends.

In Step S204, state manager 32 transmits, to terminal 10, the change-in-state notification including information indicating the state of water heating system 30 changed in Step S202. After Step S204, the series of steps shown in FIG. 3 ends.

Figure 4:
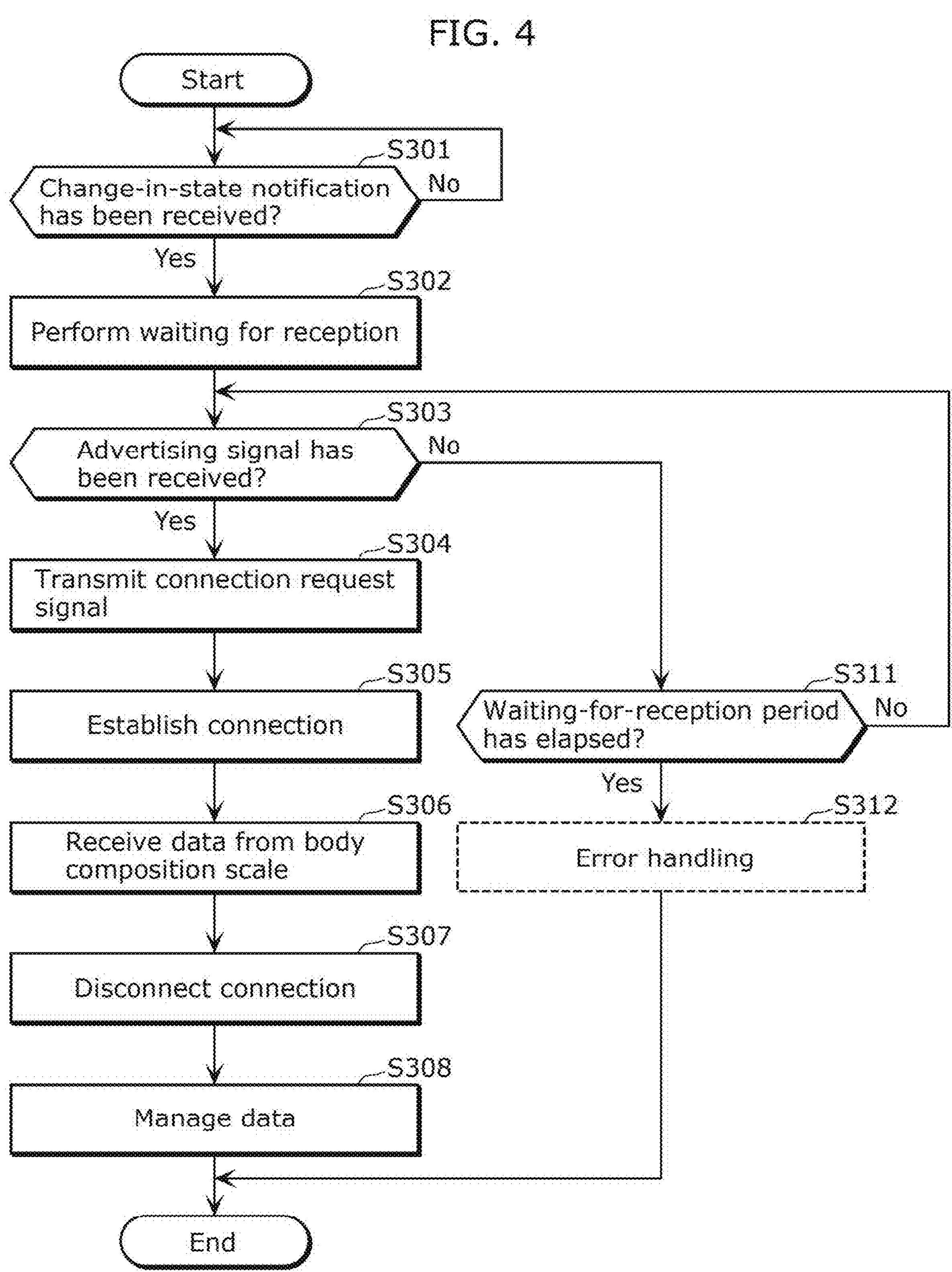
FIG. 4 is a flow diagram illustrating an exemplary process of a terminal according to the embodiment.

FIG. 4 is a flow diagram illustrating an exemplary process of terminal 10 according to the present embodiment.

In Step S301, communication controller 13 determines whether the change-in-state notification has been received from water heating system 30 by communicator 12. When it is determined that the change-in-state notification has been received (Yes in Step S301), the next step is Step S302, and otherwise (No in Step S301), Step S301 is performed again. In other words, communication controller 13 waits at Step S301 until reception of the change-in-state notification. The change-in-state notification to be received is the notification transmitted from water heating system 30 in Step S204 (see FIG. 3).

In Step S302, communication controller 13 controls communicator 11 to perform waiting for reception. With this, communicator 11 performs waiting for reception. The time when Step S302 is performed corresponds to the start of a waiting-for-reception period.

In Step S303, communicator 11 determines whether the advertising signal has been received during the waiting-for-reception period. This advertising signal may be the advertising signal transmitted by body composition scale 20 in Step S103 (see FIG. 2).

In Step S304, in response to reception of the advertising signal in Step S303, communication controller 13 controls communicator 11 to transmit a connection request signal to body composition scale 20. Communicator 11 transmits the connection request signal to body composition scale 20.

In Step S305, communicator 11 establishes a BLE connection with body composition scale 20.

In Step S306, data manager 14 receives data from body composition scale 20 through the connection established in Step S305.

In step S307, communicator 11 disconnects the connection established in Step S305.

In Step S308, data manager 14 manages data received in Step S306.

In Step S311, communication controller 13 determines whether the waiting-for-reception period has elapsed. More specifically, when the length of the waiting-for-reception period has elapsed since Step S302 (i.e., the start of the waiting-for-reception period), communication controller 13 determines that the waiting-for-reception period has elapsed. When it is determined that the waiting-for-reception period has elapsed (Yes in Step S311), the next step is Step S312, and otherwise (No in Step S311), the next step is Step S303.

In Step S312, terminal 10 may perform error handling. For example, in order to easily establish a BLE connection in the future, the error handling may include a control process that lengthens the waiting-for-reception period or a control process that lengthens the advertising period. The control process that lengthens the advertising period may include preparation for transmitting, to body composition scale 20, information instructing to lengthen the advertising period when a future connection succeeds. Moreover, the error handling may include a process that presents, to a user, notification information indicating that terminal 10 has failed to establish a short-range wireless communication connection with body composition scale 20.

It is to be noted that the process in Step S312 may be also regarded as a process when failed to establish a BLE connection. This is because reception of no advertising signal during the waiting-for-reception period (No in Step S311) may be expressed as failed to establish a BLE connection.

After Step S308 or S312, the series of steps shown in FIG. 4 ends.

The following describes an exemplary series of processes of communication system 1. Here, the exemplary series of processes of communication system 1 in the case where undressing, measuring body weight, and entering the bathroom are performed in this order when a user takes a bath is described with reference to a comparison example.

Figures 5, 6:
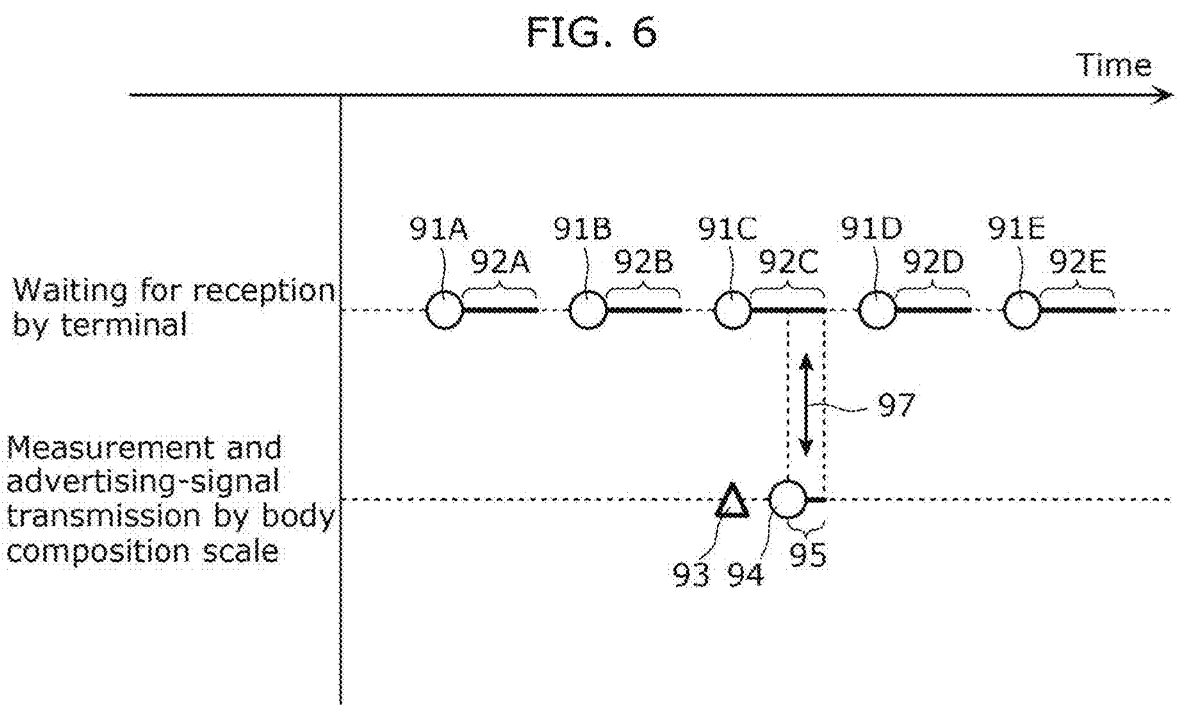
FIG. 5 is a diagram illustrating timings of a change in state of the water heating system, waiting for reception by the terminal, and measurement and advertising-signal transmission by the body composition scale, according to the embodiment.
FIG. 6 is a diagram illustrating timings of waiting for reception by the terminal, and measurement and advertising-signal transmission by the body composition scale, according to a comparison example.

FIG. 5 is a diagram illustrating timings of a change in state of water heating system 30, waiting for reception by terminal 10, and measurement and advertising-signal transmission by body composition scale 20, according to the present embodiment.

In communication system 1, a user who entered the bathroom causes water heating system 30 to make change 40 from the "state in which no person is present in the bathroom" to the "state in which a person is present in the bathroom". Water heating system 30 transmits the change-in-state notification to terminal 10 using change 40 as a trigger.

Reception of the change-in-state notification transmitted by water heating system 30 is used as a trigger for terminal 10 to perform control 41 of waiting for reception. In this manner, the waiting for reception is performed during waiting-for-reception period 42.

Body composition scale 20 performs measurement 43 of the body weight of a user, and performs control 44 of transmitting the advertising signal after generating data including the measurement value. In this manner, the advertising signal is transmitted during advertising period 45.

Advertising period 45 overlaps with waiting-for-reception period 42. Accordingly, the advertising signal transmitted by body composition scale 20 is received by terminal 10 that is in the middle of waiting-for-reception period 42. When the advertising signal transmitted by body composition scale 20 has been received by terminal 10 that is waiting for reception, a BLE connection is established between body composition scale 20 and terminal 10, thereby allowing for data communication 47. Data communication 47 may include the transmitting of data to terminal 10 by body composition scale 20.

FIG. 6 is a diagram illustrating timings of waiting for reception by a terminal, and measurement and advertising-signal transmission by a body composition scale, according to a comparison example.

The communication system according to the comparison example is similar to communication system 1, but differs from communication system 1 in that water heating system 30 is not included. The communication system according to the comparison example does not include water heating system 30, and thus the terminal repeatedly performs waiting for reception to receive the advertising signal transmitted by the body composition scale at any time.

More specifically, the terminal sequentially performs controls 91A, 91B, 91C, 91D, and 91E of waiting for reception. In this manner, the terminal performs waiting for reception during waiting-for-reception periods 92A, 92B, 92C, 92D, and 92E.

The body composition scale performs measurement 93 of the body weight of a user, and performs control 94 of transmitting the advertising signal after generating data including the measurement value. In this manner, the advertising signal is transmitted during advertising period 95.

Waiting-for-reception periods 92A and 92B do not overlap with advertising period 95. Accordingly, in the cases of waiting-for-reception periods 92A and 92B, the terminal ends the waiting for reception without receiving an advertising signal.

Subsequently, advertising period 95 starts after waiting-for-reception period 92C starts, and thus advertising period 95 overlaps with waiting-for-reception period 92C. Accordingly, the advertising signal transmitted by the body composition scale is received by the terminal that is in the middle of waiting-for-reception period 92C. The terminal further performs waiting for reception during waiting-for-reception periods 92D and 92E to receive the advertising signal transmitted by the body composition scale at any time.

In the communication system according to the comparison example, the advertising signal is not transmitted by the body composition scale during waiting-for-reception periods 92A, 92B, 92D, and 92E of the terminal. Accordingly, due to waiting for reception during waiting-for-reception periods 92A, 92B, 92D, and 92E of the terminal, communication system according to the comparison example consumes more electric power than communication system 1 according to the present embodiment.

In other words, in comparison to the communication system according to the comparison example, communication system 1 according to the present embodiment can establish a short-range wireless communication connection while reducing the power consumption by power consumption for waiting for reception during waiting-for-reception periods 92A, 92B, 92D, and 92E of the terminal in the comparison example.

It is to be noted that, instead of water heating system 30, communication system 1 may include a washing machine having a deodorizing function for deodorizing the inside of the washing machine tub. In this case, the washing machine can transmit, to terminal 10, a change-in-state notification indicating that the deodorizing function has changed from a non-operating state to an operating state. Terminal 10 determines the first period after receiving the change-in-state notification, and performs waiting for reception of an announcement signal during the determined first period.

Here, the deodorizing function for deodorizing the inside of the washing machine tub generates fine ions in the washing machine tub to suppress odor from clothes or the like put in the washing machine tub. The deodorizing function starts to operate, for example, at a time when a user sets a timer to cause the washing machine to do the washing a few hours later from the current time. In other cases, the deodorizing function does not start to operate. In the case where undressing, putting the clothes taken off into the washing machine tub, measuring body weight, and entering the bathroom are performed in this order when a user takes a bath, the change-in-state notification indicating that the deodorizing function has changed to the operating state is available.

Variation 1 of Embodiment

According to the present variation, another example of the communication control method or the like that establishes a short-range wireless communication connection while reducing the power consumption is described.

Figure 7:
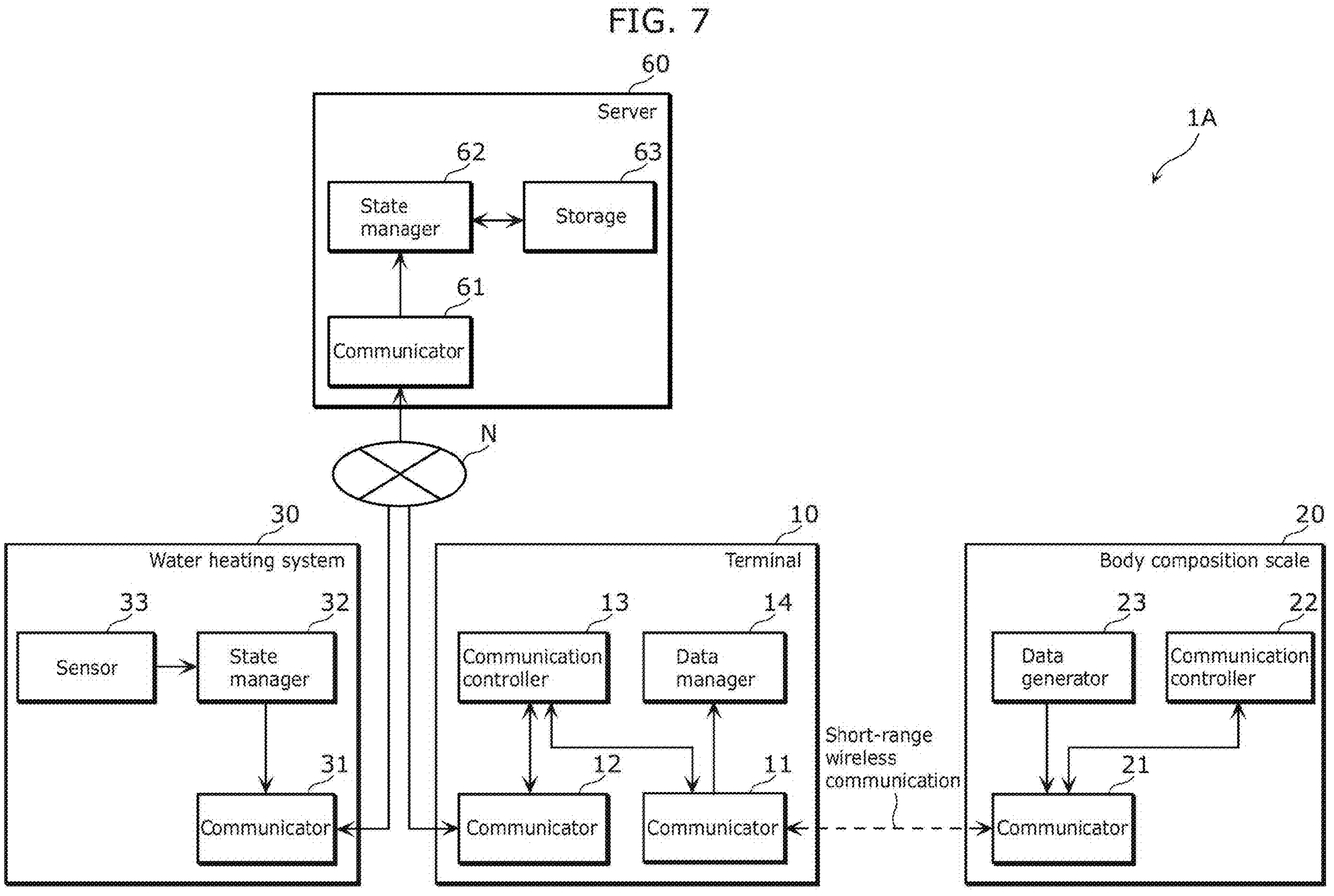
FIG. 7 is a diagram illustrating a communication system according to Variation 1 of the embodiment.

FIG. 7 is a diagram illustrating communication system 1A according to the present variation.

As shown in FIG. 7, communication system 1A includes terminal 10, body composition scale 20, water heating system 30, and server 60.

As with the case of the embodiment described above, it is assumed that terminal 10, body composition scale 20, and water heating system 30 are placed in one dwelling. The physical position of server 60 is not limited as long as server 60 is placed in a position where it can communicate with terminal 10 and water heating system 30 through network N.

The main functions of terminal 10, body composition scale 20, and water heating system 30 are the same as those of the corresponding constitutional elements in the embodiment described above, but the communication path of the change-in-state notification is different.

More specifically, water heating system 30 according to the present variation differs from water heating system 30 according to the embodiment described above in that water heating system 30 according to the present variation transmits a change-in-state notification to server 60 through network N. Moreover, terminal 10 according to the present variation differs from terminal 10 according to the embodiment described above in that terminal 10 according to the present variation receives the change-in-state notification from server 60 through network N.

Communication system 1A includes one or more apparatuses each having a function of monitoring a change in operation or state, and water heating system 30 may be one of the one or more apparatuses.

Server 60 is a server device that manages the states of one or more apparatuses in the dwelling of a user. The one or more apparatuses in the dwelling of a user include water heating system 30.

Server 60 includes communicator 61, state manager 62, and storage 63.

Communicator 61 is communicably connected to network N, and is a communication interface for communicating with terminal 10 and one or more apparatuses including water heating system 30. Communicator 61 may be a wired communication interface or a wireless communication interface. Communicator 61 receives a change-in-state notification from each of one or more apparatuses including water heating system 30, and provides the received change-in-state notification to state manager 62. Moreover, communicator 61 transmits, to terminal 10, a change-in-state notification generated by state manager 62.

State manager 62 is a function unit that manages the states of one or more apparatuses. State manager 62 is implemented by causing a processor (e.g. a CPU) of server 60 to execute a predetermined program. For each of the one or more apparatuses, state manager 62 stores and accumulates, on storage 63, the change-in-state notification received from the apparatus, and refers to the change-in-state notification stored on storage 63 to manage the state of the apparatus.

Moreover, when the state of at least one of the one or more apparatuses has changed, state manager 62 transmits, to terminal 10, a notification including information indicating the changed state.

Moreover, state manager 62 regards the one or more apparatus as candidate apparatuses (also referred to as candidate objects), and may select a trigger apparatus from among the candidate apparatuses. The trigger apparatus triggers terminal 10 to perform waiting for reception. In this case, state manager 62 obtains one or more timings when body composition scale 20 operates (also referred to as one or more first timings) and one or more timings when the state of each of the one or more candidate apparatuses changes (also referred to as one or more second timings). From among the one or more candidate apparatuses, state manager 62 can select, as the trigger apparatus, a candidate apparatus whose correlation between its one or more second timings and the one or more first timings is at least a predetermined level.

Here, the one or more first timings may be one or more timings when body composition scale 20 measures the body composition value of a user. Moreover, the one or more second timings may be one or more timings when water heating system 30 changes from a state in which sensor 33 is sensing no person to a state in which sensor 33 is sensing a person.

Storage 63 is a storage storing the states of one or more apparatuses. Storage 63 may be a random access memory (RAM), a hard disk drive (HDD), a solid state drive (SSD), or the like. Storage 63 accumulates the change-in-state notifications of one or more apparatuses.

The processes of terminal 10, body composition scale 20, and water heating system 30 according to the present variation are the same as those of the corresponding constitutional elements in the embodiment described above (see FIG. 2 through FIG. 4), but the following points are different.

Water heating system 30 according to the present variation transmits a change-in-state notification to server 60 in Step S204 (see FIG. 3). Moreover, terminal 10 according to the present variation receives the change-in-state notification from server 60 in Step S301 (see FIG. 4).

Next, the process of server 60 is described.

Figure 8:
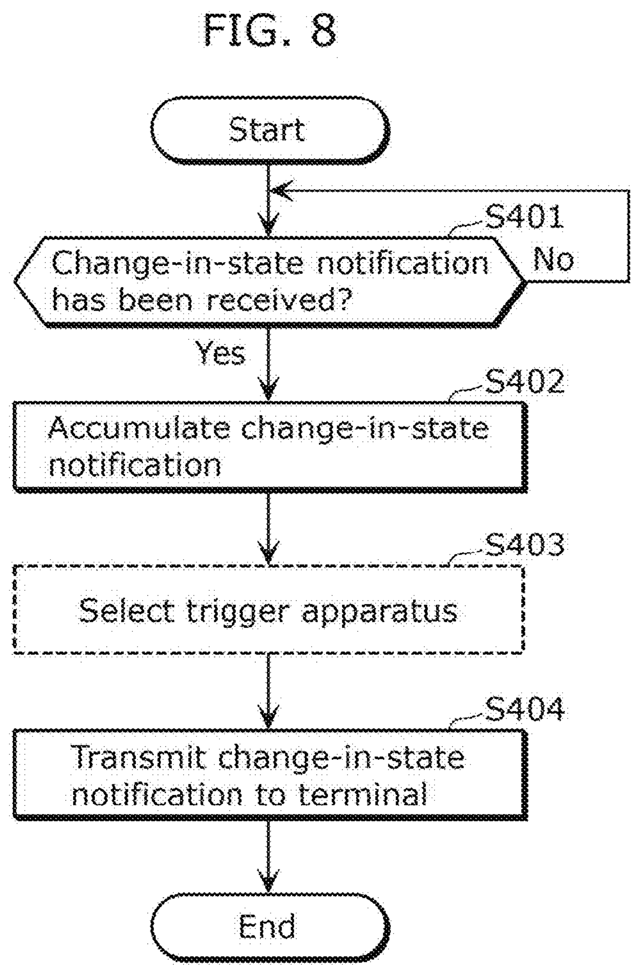
FIG. 8 is a flow diagram illustrating an exemplary process of a server according to Variation 1 of the embodiment.

FIG. 8 is a flow diagram illustrating an exemplary process of server 60 according to the present variation.

In Step S401, state manager 62 determines whether the change-in-state notification has been received by communicator 61 from water heating system 30. When it is determined that the change-in-state notification has been received (Yes in Step S401), the next step is Step S402, and otherwise (No in Step S401), Step S401 is performed again. In other words, state manager 62 waits at Step S401 until reception of the change-in-state notification.

In Step S402, state manager 62 stores and accumulates the change-in-state notification received in Step S401 on storage 63.

In Step S403, state manager 62 selects a trigger apparatus using the change-in-state notifications accumulated on storage 63. When the trigger apparatus is selected, state manager 62 notifies terminal 10 of the selected trigger apparatus. Subsequently, terminal 10 notified of the trigger apparatus operates to perform waiting for reception when receiving the change-in-state notification regarding the intended trigger apparatus. It is to be noted that the process in Step S403 need not be performed. Moreover, the process in Step S403 may be performed not after Step S402 but at any time.

In Step S404, state manager 62 transmits a change-in-state notification to terminal 10.

Terminal 10 according to the present variation receives the change-in-state notification from server 60, determines the first period using the received change-in-state notification in the same manner as terminal 10 according to the embodiment described above, and waits for reception of the advertising signal. In this manner, communication system 1A produces the same advantageous effects as communication system 1 according to the embodiment described above.

Moreover, it is possible to appropriately select an apparatus serving as a basis of the determination of the first period from among one or more candidate apparatuses, and determine the first period based on the selected apparatus to wait for reception of the advertising signal.

It is to be noted that, instead of water heating system 30, communication system 1A may include a washing machine having a deodorizing function for deodorizing the inside of the washing machine tub. In this case, the one or more first timings described above may be one or more timings when body composition scale 20 measures the body weight of a user as described the above. Moreover, the one or more second timings as described above may be one or more timings when the washing machine changes from a state in which the deodorizing function is not operating to a state in which the deodorizing function is operating.

Variation 2 of Embodiment

According to the present variation, another example of the communication control method or the like that establishes a short-range wireless communication connection while reducing the power consumption is described.

Figure 9:
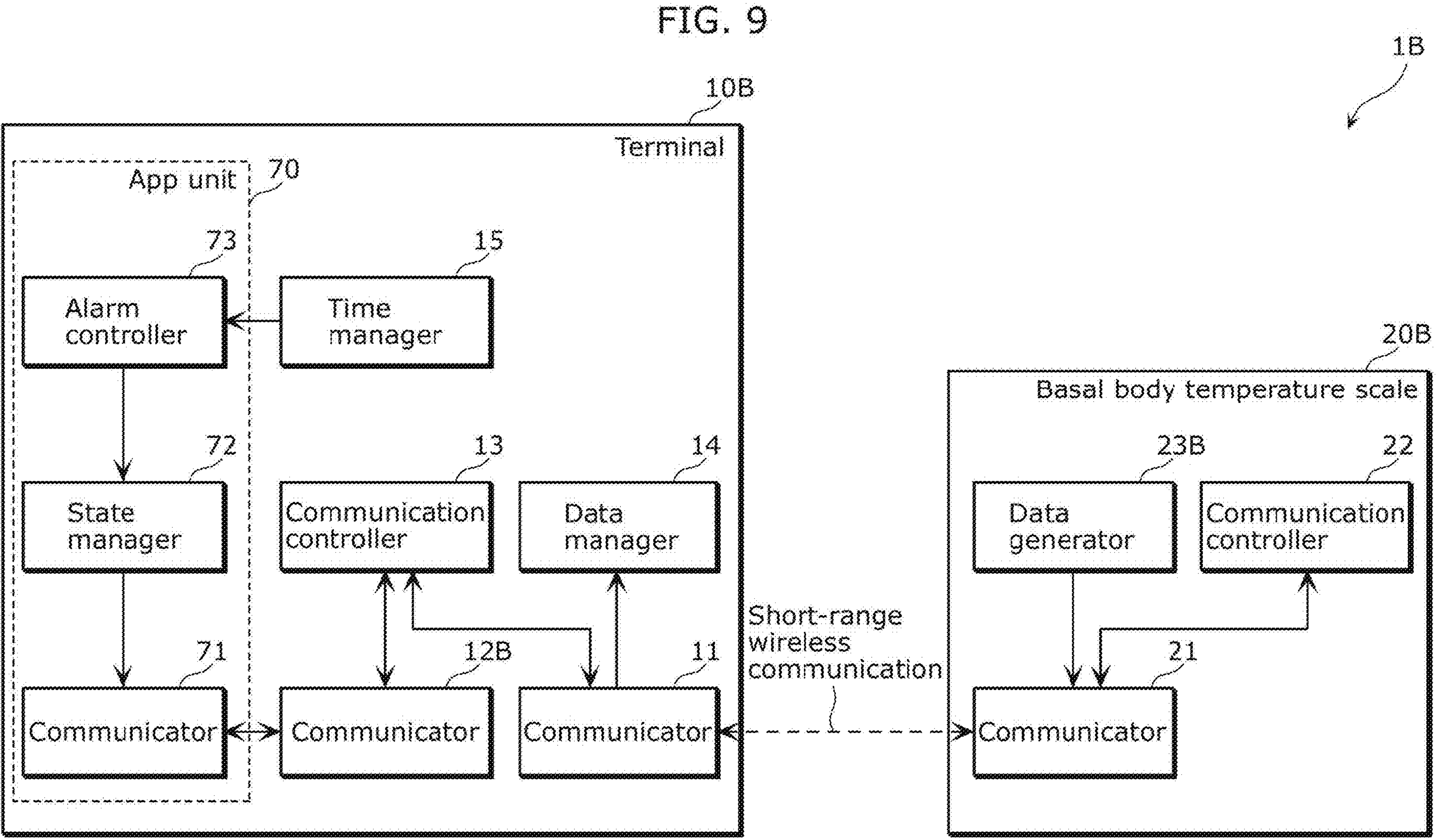
FIG. 9 is a diagram illustrating a communication system according to Variation 2 of the embodiment.

FIG. 9 is a diagram illustrating communication system 1B according to the present variation.

As shown in FIG. 9, communication system 1B includes terminal 10B and basal body temperature scale 20B.

As with the case of terminal 10 and body composition scale 20 according to the embodiment described above, it is assumed that terminal 10B and basal body temperature scale 20B are placed in one dwelling.

In the present variation, a process running on terminal 10B by an application software (also referred to as an app) is an example of an object having a communication function and having a function of monitoring a change in operation or state of the object.

Terminal 10B is an information processing device that obtains and holds a measurement value of basal body temperature scale 20B. For example, terminal 10B is a smart phone, a tablet computer, a personal computer, or the like.

Terminal 10B includes communicators 11 and 12B, communication controller 13, data manager 14, time manager 15, and app unit 70.

Communicator 11, communication controller 13, and data manager 14 are the same as the corresponding constitutional elements in terminal 10 according to the embodiment described above.

Communicator 12B is a communication interface for communicating with app unit 70. Communicator 12B may be an interface connected to an inner bus in a computer. Communicator 12B receives a change-in-state notification from app unit 70. When receiving the change-in-state notification, communicator 12B provides the change-in-state notification to communication controller 13.

Time manager 15 is a function unit that manages the current time on terminal 10B. Time manager 15 always updates the current time, and may provide the current time to other function units in terminal 10B.

App unit 70 is a function unit that includes a process running on terminal 10B by an app. App unit 70 is an example of an object having a communication function and having a function of monitoring a change in operation or state of the object. For example, this app activates an alarm of terminal 10B at a predetermined time, and this case is described as an example.

App unit 70 includes communicator 71, state manager 72, and alarm controller 73.

Communicator 71 is a communication interface for communicating with communicator 12B. Communicator 71 may be an interface connected to an inner bus in a computer. Communicator 71 transmits the change-in-state notification generated by state manager 72.

State manager 72 is a function unit that manages the state of app unit 70. State manager 72 is implemented by causing a processor (e.g., a CPU) of terminal 10B to execute a predetermined program, and may include a storage (e.g., a semiconductor memory) of terminal 10B. State manager 72 manages the state of app unit 70 using information obtained from alarm controller 73. More specifically, when obtaining, from alarm controller 73, information indicating that alarm controller 73 activates the alarm, state manager 72 manages the state of app unit 70 as an "alarm activated state", whereas when obtaining, from alarm controller 73, information indicating that alarm controller 73 stops the alarm, state manager 72 manages the state of app unit 70 as an "alarm non-activated state". When the state of app unit 70 changes from the "alarm activated state" to the "alarm non-activated state", state manager 72 transmits, to communicator 12B via communicator 71, the change-in-state notification including information indicating the changed state.

It is to be noted that state manager 72 may manage the operation of app unit 70 while or instead of managing the state of app unit 70. In this case, state manager 72 manages the operation of app unit 70 using information obtained from alarm controller 73. An example of the operation of app unit 70 is "snooze" that sets the alarm again to go off after a certain period of time, etc.

Alarm controller 73 is a function unit that controls the alarm of terminal 10B. State manager 72 is implemented by causing a processor (e.g. a CPU) of terminal 10B to execute a predetermined program. Alarm controller 73 determines whether a preset alarm activation time has come, and starts to activate the alarm of terminal 10B when the preset alarm activation time has come. Alarm controller 73 also stops the alarm when a user controls terminal 10B to stop the alarm while the alarm is activated.

When starting to activate the alarm, alarm controller 73 provide, to state manager 72, information indicating that the alarm is activated. When stopping the alarm, alarm controller 73 provide, to state manager 72, information indicating that the alarm is not activated.

Basal body temperature scale 20B obtains the time-series data of the basal body temperature of a user during sleep, and transmits the obtained time-series data of the basal body temperature to the terminal when the user wakes up. Using a change in state of app unit 70 from the "alarm activated state" to the "alarm non-activated state" by stopping the alarm of terminal 10B when the user during sleep wakes up, basal body temperature scale 20B transmits the basal body temperature to the terminal.

Basal body temperature scale 20B includes communicator 21, communication controller 22, and data generator 23B. Communicator 21, and communication controller 22 are the same as the corresponding constitutional elements according to the embodiment described above.

Data generator 23B is a function unit that generates data including the measurement value measured by basal body temperature scale 20B. Data generator 23B is implemented by causing a processor (e.g., a CPU) of basal body temperature scale 20B to execute a predetermined program. When basal body temperature scale 20B measures the basal body temperature of a user, data generator 23B generates data including the measured basal body temperature as the measurement value, and provides the generated data to communicator 21. Subsequently, the data is transmitted from communicator 21 to terminal 10B, and managed by terminal 10B.

The processes of terminal 10B and basal body temperature scale 20B according to the present variation are the same as those of the corresponding constitutional elements in the embodiment described above (see FIG. 2 and FIG. 4), but the following points are different.

Terminal 10B according to the present variation receives a change-in-state notification from app unit 70 in Step S301 (see FIG. 4). Moreover, basal body temperature scale 20B according to the present variation measures the basal body temperature of a user and generates data including the measured basal body temperature in Step S102 (see FIG. 2).

The process of app unit 70 according to the present variation is the same as that of water heating system 30 according to the embodiment described above (see FIG. 3), but the following points are different.

In app unit 70 according to the present variation, state manager 72 obtains the state of the alarm from alarm controller 73 in Step S201 (see FIG. 3). In Step S202, state manager 72 of app unit 70 manages the state of app unit 70 using the state of the alarm obtained in Step S201. For example, when obtaining, from alarm controller 73, information indicating that the alarm is activated, state manager 72 manages the state of water heating system 30 as the "alarm activated state".

It is to be noted that terminal 10B according to the present variation may further include the function of server 60 according to Variation 1, and communication system 1B may further include one or more objects (i.e., apparatuses or app units). In this case, the one or more first timings to be used when state manager 62 selects a trigger apparatus (a trigger app unit when the object is an app unit) may be one or more timings when basal body temperature scale 20B measures the basal body temperature of a user. Moreover, the one or more second timings to be used when state manager 62 selects a trigger apparatus may be one or more timings when app unit 70 changes from the "alarm activated state" to the "alarm non-activated state".

Terminal 10B according to the present variation receives a change-in-state notification from app unit 70, determines the first period using the received change-in-state notification in the same manner as terminal 10 according to the embodiment described above, and waits for reception of the advertising signal. In this manner, communication system 1B produces the same advantageous effects as communication system 1 according to the embodiment described above.

As described above, the embodiment is described as an example of the technique in the present disclosure. For this reason, the accompanying drawings and the detailed descriptions are provided.

Accordingly, the structural elements illustrated in the accompanying drawings and described in the detailed descriptions may include not only structural elements essential to address the issues but also structural elements provided to exemplify the above implementation although not essential to address the issues. Thus, even if the structural elements that are not essential are recited in the accompanying drawing and the detailed descriptions, the structural elements that are not essential should not be easily considered as essential structural elements.

Since the above embodiment is provided to exemplify the technique in the present disclosure, for example, various changes, replacement, addition, and omission can be performed within the claims or the equivalent scope thereof.

INDUSTRIAL APPLICABILITY

The present disclosure is applicable to a terminal that performs the short-range wireless communication with an apparatus.

REFERENCE SIGNS LIST

1, 1A, 1B communication system
10, 10B terminal
11, 12, 12B, 21, 31, 61, 71 communicator
13, 22 communication controller
14 data manager
15 time manager
20 body composition scale
20B basal body temperature scale
23, 23B data generator
30 water heating system
32, 62, 72 state manager
33 sensor
40 change
41, 44, 91A, 91B, 91C, 91D, 91E, 94 control
42, 92A, 92B, 92C, 92D, 92E waiting-for-reception period
43,93 measure
45,95 advertising period
47,97 data communication
60 server
63 storage
70 app unit
73 alarm controller
N network

The invention claimed is:

1. A communication control method for a terminal, comprising:

determining whether a notification has been received, by communicating with an object different from the terminal, having a communication function and having a function of monitoring a change in operation or state of the object, the notification indicating that the operation or the state managed by the object has changed; and when it is determined that the notification has been received, performing waiting for reception of an announcement signal for establishing short-range wireless communication with an apparatus different from the object, wherein:

the apparatus is a body composition scale, the object is a washing machine having a deodorizing function for deodorizing an inside of a washing machine tub, and the notification indicates that the deodorizing function has changed from a non-operating state to an operating state.

2. The communication control method according to claim 1, wherein reception of the notification includes:

reception of a notification transmitted by a server to the terminal after the notification is transmitted by the object to the server, the notification indicating that the operation or the state managed by the object has changed.

3. The communication control method according to claim 1, further comprising:

selecting the object from among one or more candidate objects, wherein the selecting includes:

obtaining one or more first timings when the apparatus operates and one or more second timings when the operation or the state of each of the one or more candidate objects changes; and from among the one or more candidate objects, selecting, as the object, a candidate object whose correlation between the one or more second timings of the candidate object and the one or more first timings is at least a predetermined level.

4. The communication control method according to claim 3, wherein the one or more first timings are one or more timings when the body composition scale measures a body weight of a user, and the one or more second timings are one or more timings when the washing machine changes from a state in which the deodorizing function is not operating to a state in which the deodorizing function is operating.

5. A terminal comprising:

a communication controller that determines whether a notification has been received, by communicating with an object different from the terminal, having a communication function and having a function of monitoring a change in operation or state of the object, the notification indicating that the operation or the state managed by the object has changed; and a communicator that performs, when the communication controller determines that the notification has been received, waiting for reception of an announcement signal for establishing short-range wireless communication with an apparatus different from the object, wherein:

the apparatus is a body composition scale, the object is a washing machine having a deodorizing function for deodorizing an inside of a washing machine tub, and the notification indicates that the deodorizing function has changed from a non-operating state to an operating state.

6. A non-transitory computer-readable recording medium storing a program for causing a computer to execute the communication control method according to claim 1.

* * * * *